United States Patent
Uchida (10) Patent No.: US 9,922,030 B2
(45) Date of Patent: Mar. 20, 2018

(54) INFORMATION-SYSTEM-CONSTRUCTION SUPPORT TOOL AND INFORMATION-SYSTEM-CONSTRUCTION SUPPORT PROGRAM

(71) Applicant: Mitsubishi Electric Corporation, Tokyo (JP)

(72) Inventor: Ryo Uchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/528,553

(22) PCT Filed: Dec. 15, 2014

(86) PCT No.: PCT/JP2014/083177
§ 371 (c)(1),
(2) Date: May 22, 2017

(87) PCT Pub. No.: WO2016/098168
PCT Pub. Date: Jun. 23, 2016

(65) Prior Publication Data
US 2017/0262436 A1  Sep. 14, 2017

(51) Int. Cl.
*G06F 17/30* (2006.01)
(52) U.S. Cl.
CPC .. *G06F 17/30002* (2013.01); *G06F 17/30011* (2013.01); *G06F 17/30312* (2013.01);
(Continued)
(58) Field of Classification Search
CPC ......... G06F 17/30002; G06F 17/30011; G06F 17/30312; G06F 17/3002; G06F 17/30286; G06F 17/30345; G06F 17/30598
(Continued)

(56) References Cited

U.S. PATENT DOCUMENTS 7,493,310 B2 * 2/2009 Eryurek ............... G05B 19/418
7,827,494 B1 * 11/2010 Hedayatpour ........... G06F 8/38
709/203
(Continued)

FOREIGN PATENT DOCUMENTS

JP       07-160311 A    6/1995
JP     2003-177978 A    6/2003
(Continued)

OTHER PUBLICATIONS

Taichi Koyama, "SCADA software and its application," Instrumentation and Automation, Japan Industrial Publishing Co., Ltd., Apr. 5, 2011, pp. 12-15, vol. 39, No. 5.
(Continued)

*Primary Examiner* — Thanh-Ha Dang
(74) *Attorney, Agent, or Firm* — Sughrue Mion, PLLC; Richard C. Turner (57) ABSTRACT

An information-system-construction support tool that generates screen data for displaying data of a PLC on a display unit, and setting data for a database that stores therein the data of the PLC, the tool including a storage unit capable of being read by a screen-display edit tool that displays and edits a screen using the screen data and a setting tool for the database, a setting input unit to receive a datatype of the data of the PLC, a screen-type input unit to receive a screen type of the screen data, a database setting unit to receive setting data for the database, and a data generation unit to generate, in the storage unit, data associating the screen data by the screen type and the setting data for the database on a datatype-by-datatype basis.

10 Claims, 9 Drawing Sheets

(52) U.S. Cl.
CPC .... *G06F 17/3002* (2013.01); *G06F 17/30286* (2013.01); *G06F 17/30345* (2013.01); *G06F 17/30598* (2013.01)

(58) Field of Classification Search
USPC .......................................................... 707/802
See application file for complete search history.

(56) References Cited

U.S. PATENT DOCUMENTS

| | | | |
|---|---|---|---|
| 8,381,117 B2* | 2/2013 | Ueno ................. | G05B 23/0272 715/771 |
| 8,392,845 B2* | 3/2013 | Cahill .................... | G05B 15/02 715/764 |
| 8,438,192 B2* | 5/2013 | Obitko ................... | G05B 21/02 707/791 |
| 8,825,183 B2* | 9/2014 | Hammack ............ | G05B 19/409 700/17 |
| 9,344,604 B2* | 5/2016 | Miyazaki ............. | H04N 1/6011 |
| 9,372,835 B2* | 6/2016 | Kief .................... | G06F 17/2241 |
| 2003/0033037 A1* | 2/2003 | Yuen .................. | G05B 19/0426 700/86 |
| 2006/0010230 A1* | 1/2006 | Karklins ................ | G05B 19/05 709/223 |
| 2006/0069689 A1* | 3/2006 | Karklins ................ | G05B 19/05 |
| 2006/0097956 A1* | 5/2006 | Ogawa .................... | H04L 67/36 345/2.1 |
| 2007/0067458 A1* | 3/2007 | Chand ............... | G06F 17/30569 709/226 |
| 2009/0089226 A1* | 4/2009 | Bradford ............. | H04L 41/0631 706/12 |
| 2009/0248173 A1* | 10/2009 | Sasko .............. | G05B 19/41875 700/9 |
| 2011/0083092 A1* | 4/2011 | Ito ...................... | G05B 19/4063 715/771 |
| 2012/0041570 A1* | 2/2012 | Jones ................. | G05B 19/0426 700/17 |
| 2013/0275893 A1* | 10/2013 | Kawamura ........... | G06F 3/0481 715/763 |
| 2014/0108515 A1* | 4/2014 | Stawikowski ...... | H04L 67/2804 709/203 |

FOREIGN PATENT DOCUMENTS

| | | |
|---|---|---|
| JP | 2004-030345 A | 1/2004 |
| JP | 2004-178157 A | 6/2004 |
| JP | 2005-011169 A | 1/2005 |
| JP | 2011-215813 A | 10/2011 |
| WO | 2012/086049 A1 | 6/2012 |

OTHER PUBLICATIONS

Hiroki Tanabe, "Extending application area of PLC and its actual operation," Instrumentation Control Engineering, Kogyogijutsusha Ltd., Apr. 15, 2004, pp. 53-56, vol. 47, No. 5.
Yuji Watanabe et al., "Development of Real Time SQL Generation Module for Industrial Equipment", Information Processing Society of Japan, Nov. 20, 2009, pp. 137-146, vol. 2, No. 2.
Japanese Notice of Rejection issued for JP 2016-554295 dated Nov. 1, 2016.
International Search Report of PCT/JP2014/083177 dated Mar. 17, 2015.
Communication dated Nov. 2, 2017 from the Korean Intellectual Property Office in counterpart application No. 10-2017-7016127.

* cited by examiner

| TEMPLATE 60 | | | | | | |
|---|---|---|---|---|---|---|
| | DATATYPE 61 | SCREEN DATA 62 | | | DATABASE SETTING DATA 66 | DATABASE-CONNECTION-UNIT SETTING DATA 67 |
| | | EQUIPMENT SCREEN COMPONENT 63 | TREND GRAPH 64 | SEARCH SCREEN 65 | | |
| | BASIC UNIT | EquipmentData(a) | TrendGraphData(a) | SearchData(a) | DBData(a) | DBConnection UnitData(a) |
| | ELECTRIC POWER CONSUMPTION | EquipmentData(b) | TrendGraphData(b) | SearchData(b) | DBData(b) | DBConnection UnitData(b) |
| | PRODUCTION QUANTITY | EquipmentData(c) | TrendGraphData(c) | SearchData(c) | DBData(c) | DBConnection UnitData(c) |
| | ... | ... | ... | ... | ... | ... |

INFORMATION-SYSTEM-CONSTRUCTION SUPPORT TOOL AND INFORMATION-SYSTEM-CONSTRUCTION SUPPORT PROGRAM

CROSS REFERENCE TO RELATED APPLICATIONS

This application is a National Stage of International Application No. PCT/JP2014/083177 filed Dec. 15, 2014, the contents of which are incorporated herein by reference in its entirety.

FIELD

The present invention relates to an information-system-construction support tool and an information-system-construction support program that generate screen data and various types of setting data for user's intended purposes in constructing an information system to improve the productivity and the equipment utilization rate on a production site.

BACKGROUND

In an information system, a PLC (programmable logic controller) collects information on a production site and accumulates the collected data in a database via a database connection unit. The database connection unit has a function of rapidly accumulating the momently changing production data in the database through the PLC to visualize the production activity. For example, the production status and the equipment operation status are displayed on a display device on the basis of the accumulated data.

Constructing the information system requires drawing a screen, setting a database, and setting a database connection unit. The screen drawing is, for example, an equipment-screen drawing or a trend-graph screen drawing.

In techniques disclosed in Patent Literatures 1 and 2, operation data on various installed devices, generation data on a monitor screen, and control data to be monitored are periodically sampled and captured, and graphically displayed. Unfortunately, these techniques do not clarify what parameters should be used. It is thus difficult to provide screens and graphs for user's intended purposes in constructing an information system to improve productivity and equipment utilization rate on a production site.

In the technique disclosed in Patent Literature 2, control data to be monitored is periodically sampled and loaded to display the graph. However, this technique is dedicated to graphically displaying the result of tuning that finely adjusts parameters. Accordingly, a wide variety of screens such as an equipment screen and a search screen as well as a trend graph cannot be provided for the information system.

To construct the information system in a situation where there is an increased number of devices at a worksite, thus, much work is required because, in those conventional techniques, there is no mechanism for providing efficient work of designing and drawing a screen such as an equipment screen or a trend graph screen, setting a database, and setting a database connection unit.

CITATION LIST

Patent Literatures

Patent Literature 1: Japanese Patent Application Laid-open No. 2004-30345

Patent Literature 2: Japanese Patent Application Laid-open No. 2004-178157

SUMMARY

Technical Problem

That is, according to the techniques described above, when a system scale of a PLC system having a plurality of PLCs is large and a user attempts to create system-monitoring screens one by one, a design man-hour for creating the screens is increased due to the large number of units within one screen and the large number of screens. At the same time, the work of setting a database is also increased, which is a burden on the user.

The present invention has been achieved in view of the above problems, and an object of the present invention is to provide an information-system-construction support tool and an information-system-construction support program that reduce a work burden on a user for creating system-monitoring screens and setting a database in constructing an information system.

Solution to Problem

To solve the above problem and achieve the object, the present invention provides an information-system-construction support tool that generates screen data for displaying data of a PLC on a display unit, and setting data for a database that stores therein the data of the PLC, the information-system-construction support tool comprising: a storage unit capable of being read by a screen-display edit tool that displays and edits a screen using the screen data and a setting tool for the database; a setting input unit to receive a datatype of the data of the PLC; a screen-type input unit to receive a screen type of the screen data; a database setting unit to receive setting data for the database; and a data generation unit to generate, in the storage unit, data associating the screen data by the screen type with the setting data for the database on a datatype-by-datatype basis.

Advantageous Effects of Invention

The information-system-construction support tool according to the present invention can reduce a work burden on a user for creating system-monitoring screens and setting a database in constructing an information system.

DESCRIPTION OF EMBODIMENT

An exemplary embodiment of an information-system-construction support tool and an information-system-construction support program according to the present embodiment will be described in detail below based on the drawings. The present invention is not limited by the embodiments.

Embodiment

Figure 1:
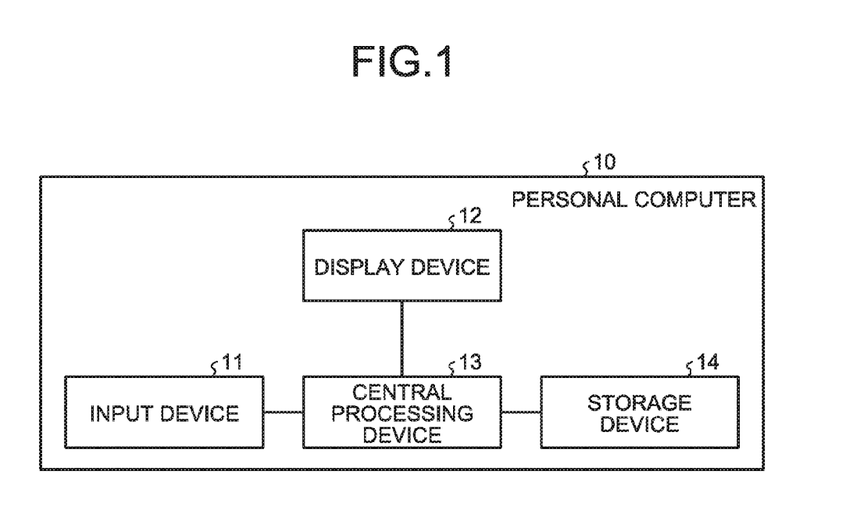
FIG. 1 is an explanatory block diagram of an overall configuration of hardware of a personal computer according to an embodiment of the present invention.

FIG. 1 is an explanatory block diagram of an overall configuration of hardware of a personal computer 10 according to an embodiment of the present invention. As an embodiment of an information-system-construction support tool, an information-system-construction support tool can be installed in a tablet terminal or can be provided by an ASP (Application Service Provide) service. An example in which an information-system-construction support tool is installed in the personal computer 10 is described below. The personal computer 10 includes an input device 11 being a pointing device typified by a keyboard and a mouse, a display device 12 being a display unit that displays information to a user, a central processing device 13 such as a CPU (Central Processing Unit), and a storage device 14 being a storage unit that has a non-volatile storage device and a volatile storage device. On the basis of data of a template, the storage device 14 collectively stores therein an equipment screen component, a trend graph, a search screen, database setting data, and database-connection-unit setting data generated by a data generation unit 26, as will be described later. The storage device 14 also stores therein data such as setting values input by a user, as will be described later. The volatile storage device of the storage device 14 is appropriately used as a work memory during execution of the central processing device 13.

Figure 2:
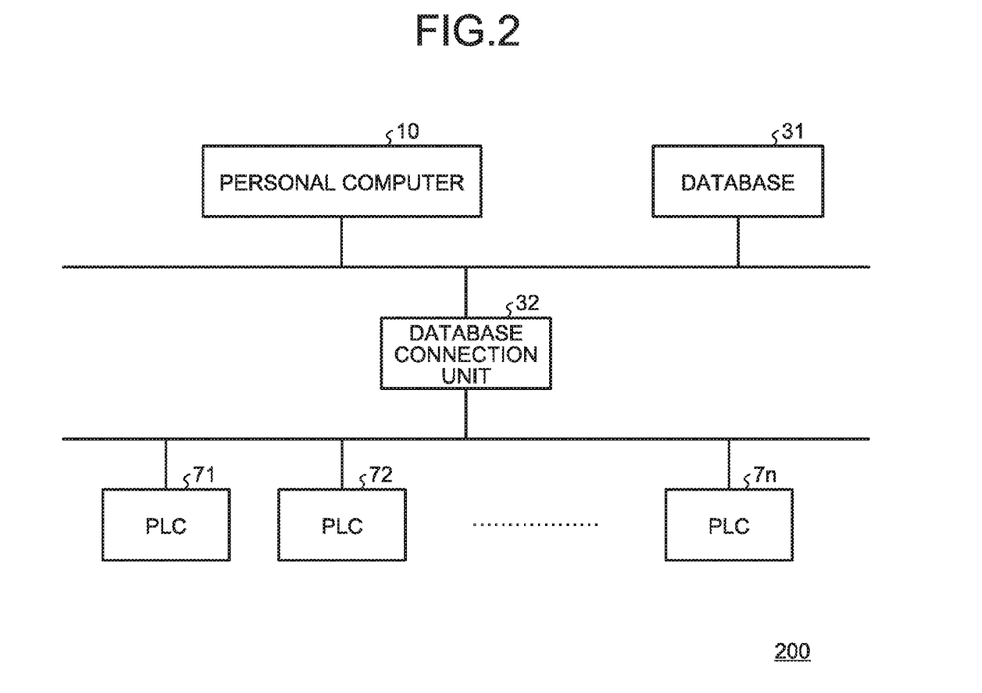
FIG. 2 is a configuration diagram of an information system according to the embodiment of the present invention.

FIG. 2 is a configuration diagram of an information system 200 according to the present embodiment. The information system 200 includes the personal computer 10 having the information-system-construction support tool installed therein, a database 31 being a relational database, a database connection unit 32 to store data in the database 31, and PLCs 71, 72, . . . , 7n connected to the database connection unit 32.

In the relational database of the database 31, one piece of data is represented as a plurality of items, that is, a set of fields, and a set of data is represented in the form of a chart called "table". Initially, a relational-database management system that is installed in the personal computer 10 separately from the information-system-construction support tool creates the database 31 by determining a database name and performing setting of the table and the fields. The relational-database management system can use commercially available software. The relational-database management system sets the field name, the table name, and the database name of the database 31.

The PLCs 71, 72, . . . 7n obtain information regarding the equipment operation status and the production status on a production site. Specific examples of the production status on the production site include a basic unit, an electric power consumption, a production quantity, an amount of raw material stock, an operating time, the number of failed products, the number of quality products, and the number of production plans. Specific examples of the equipment operation status include an operation status of a machine tool, such as working, stop, and standby, malfunction information of a machine tool, information indicating whether lighting equipment, temperature control equipment, and air conditioning equipment are in an ON state or an OFF state, and current temperature values of the lighting equipment, the temperature control equipment, and the air conditioning equipment. The database connection unit 32 collects the data obtained by the PLCs 71, 72, . . . , 7n and stores the collected data in the database 31. The production status and the equipment operation status are displayed on the display device 12 on the basis of the data accumulated in the database 31.

Figure 3:
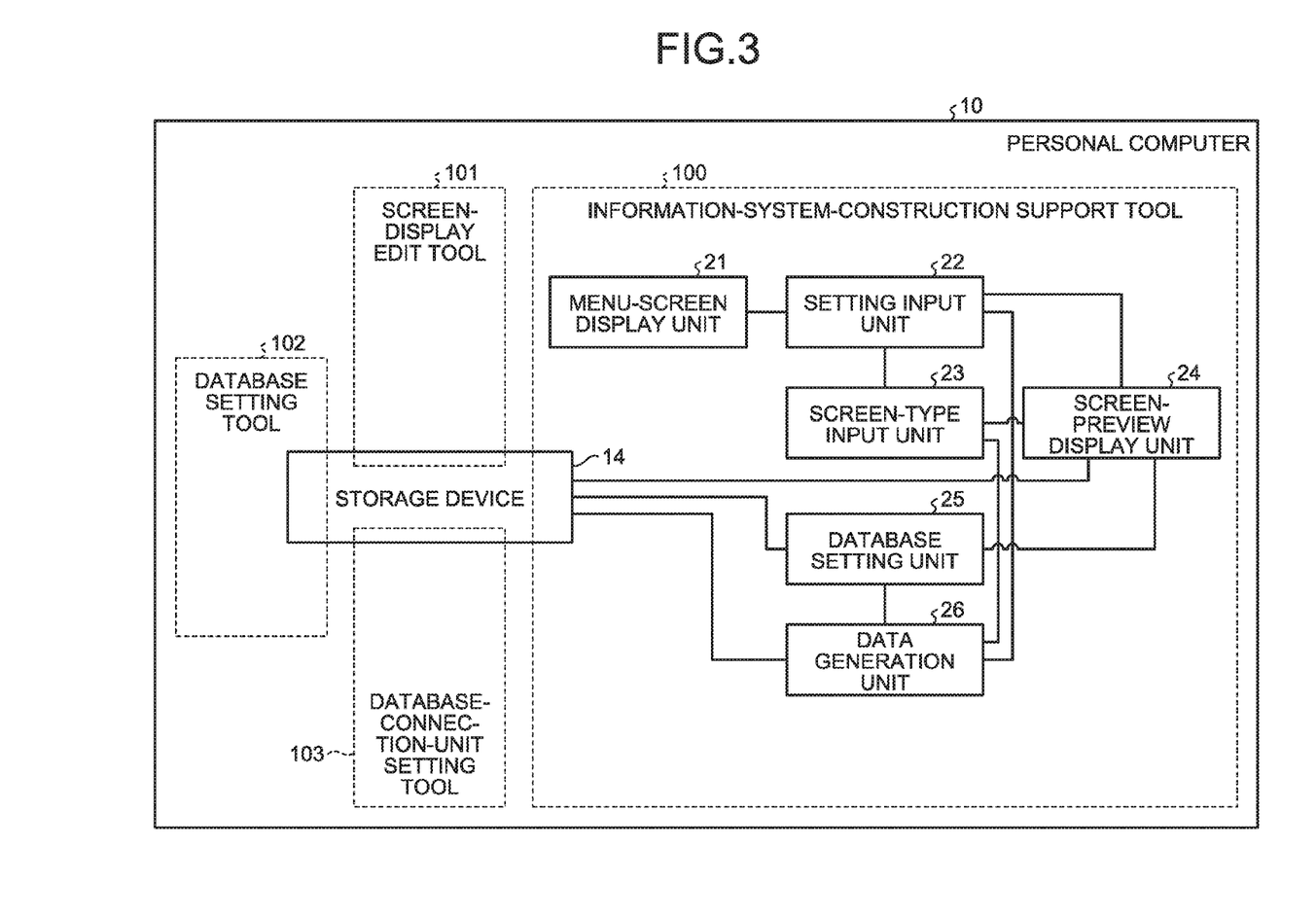
FIG. 3 is a block diagram illustrating configurations of an information-system-construction support tool, a screen-display edit tool, a database setting tool, and a database-connection-unit setting tool according to the embodiment of the present invention.

FIG. 3 is a block diagram illustrating a configuration of an information-system-construction support tool 100, a screen-display edit tool 101, a database setting tool 102, and a database-connection-unit setting tool 103 that are implemented by the central processing device 13 and the storage device 14 in FIG. 1. The information-system-construction support tools 100 outputs screen data and setting data. The screen-display edit tool 101 uses the screen data. The database setting tool 102 is a relational-database management system that uses the setting data. The database-connection-unit setting tool 103 uses the setting data. Specifically, computer-executable programs that are pieces of software corresponding to the respective tools and stored in the storage device 14 are processed by the central processing device 13 to thereby implement the respective functional blocks illustrated in FIG. 3. As an example, the central processing device 13 processes an information-system-construction support program stored in the storage device 14, to thereby implement the information-system-construction support tool 100.

The information-system-construction support tool 100, the screen-display edit tool 101, the database setting tool 102, and the database-connection-unit setting tool 103 can access the storage device 14. Thus, the screen data output by the information-system-construction support tool 100 to the storage device 14 can be used by the screen-display edit tool 101, and the setting data output by the information-system-construction support tool 100 to the storage device 14 can be used by the database setting tool 102 and the database-connection-unit setting tool 103.

The information-system-construction support tool 100 includes a menu-screen display unit 21, a setting input unit 22, a screen-type input unit 23, a screen-preview display unit 24, a database setting unit 25, a data generation unit 26, and the storage device. The menu-screen display unit causes the display device 12 to display a menu screen of the tool. The setting input unit 22 receives from a user an input of a setting value on the menu screen via the input device 11. The screen-type input unit 23 receives a screen type selected from among plural types of screens by the user via the input device 11. The screen-preview display unit 24 causes the display device to display a screen image in response to a user's instruction on the basis of the setting value and selected screen type which the setting input unit 22 has received from the user. The database setting unit 25 creates data for setting of the database 31 and the database connection unit 32. The data generation unit 26 generates screen data and setting data, and outputs the generated data to the storage device 14.

The data generation unit 26 generates the screen data and the setting data on the basis of: the setting value which the setting input unit 22 has received from the user; the screen type which the screen-type input unit 23 has received from the user; and the data created by the database setting unit 25 for setting the database 31 and the database connection unit 32.

The screen-display edit tool 101 is implemented by monitoring software capable of displaying, on a screen of the display device 12, screen data created by the screen-display edit tool 101 or the information-system-construction support tool 100, such that the user can edit the screen.

The database setting tool 102, which is the relational-database management system, sets a field name, a table name, and a database name of the database 31 on the basis of database setting data 66, which will be described later.

The database-connection-unit setting tool 103, which is a functional block implemented by setting software to perform setting of the database connection unit 32, sets a link between field name of the database connection unit 32 and tags being device values of the PLCs on the basis of database-connection-unit setting data 67, which will be described later.

Figure 4:
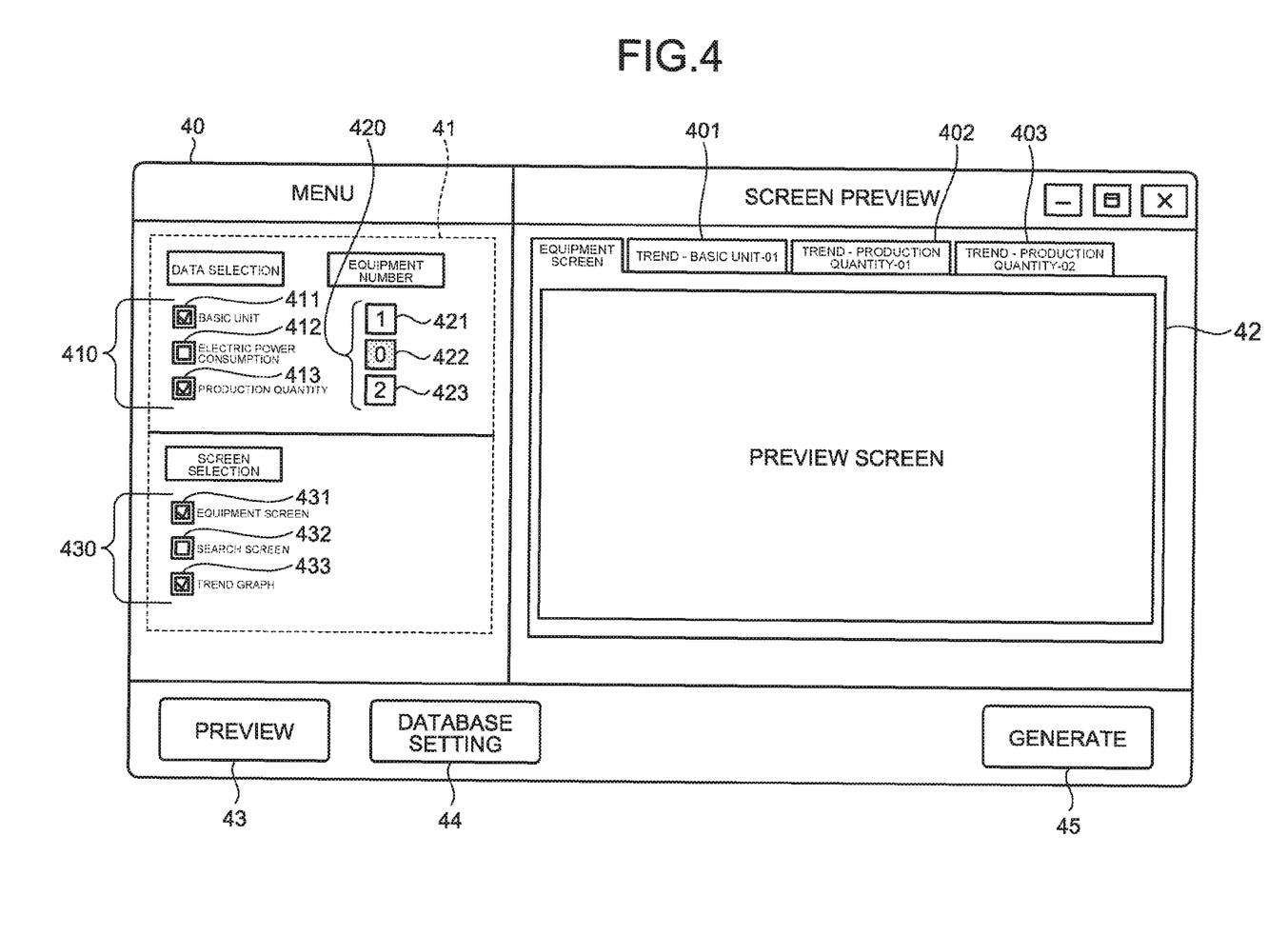
FIG. 4 is a diagram illustrating an information-system-construction support tool screen displayed on a display device according to the embodiment of the present invention.

FIG. 4 is a diagram illustrating an information-system-construction support tool screen 40 displayed on the display device 12 in the embodiment of the present invention. The information-system-construction support tool screen 40 illustrated in FIG. 4 is displayed as an initial screen of the information-system-construction support tool 100 on the display device 12 by the menu-screen display unit 21. As illustrated in FIG. 4, the information-system-construction support tool screen 40 includes a menu display portion 41 for the user to perform selection, a screen-preview display portion 42, a preview button 43, a database setting button 44, and a generation button 45. The screen-preview display portion 42 displays previews of screens which the user has selected on the menu display portion 41. The preview button 43 receives an instruction from the user to perform screen-previewing with contents selected on the menu display portion 41 by the user. The database setting button 44 receives an instruction from the user to display a database setting screen 50, which will be described later. The generation button 45 receives an instruction to perform generation of data on the basis of the contents selected and designated by the user.

A data selection section 410 for selecting datatypes on the menu display portion 41 has a checkbox 411 for "basic unit", a checkbox 412 for "electric power consumption", and a checkbox 413 for "production quantity". An equipment number section 420 for inputting the number of pieces of equipment for each of the datatypes on the menu display portion 41 has the number of pieces of equipment 421 for the "basic unit", the number of pieces of equipment 422 for the "electric power consumption", and the number of pieces of equipment 423 for the "production quantity". A screen selection section 430 for selecting screen types on the menu display portion 41 has a checkbox 431 for "equipment screen", a checkbox 432 for "search screen", and a checkbox 433 for "trend graph". The number of pieces of equipment selectable on the menu display portion 41 is the number of manufacturing lines. One manufacturing line means, for example, a series of processes such as "carry-in →working process→inspection process→carry-out". The menu display portion 41 is displayed on the display device 12 by the menu-screen display unit 21.

As screens to be displayed on a preview screen of the screen-preview display portion 42, plural patterns of screens are prepared in accordance with setting values. Screens such as "equipment screen_pattern 1" and "equipment screen_pattern 2" are displayed on the preview screen such that a user can select a screen matching his preference. Furthermore, when the number of pieces of equipment is set to be plural, the selected one of a screen of each manufacturing line being each piece of equipment and a single screen of plural pieces of equipment collected together can be displayed as the screen for the "production quantity". The screen of the collected plural pieces of equipment displays the sum of the production quantities of the respective manufacturing lines.

Figure 5:
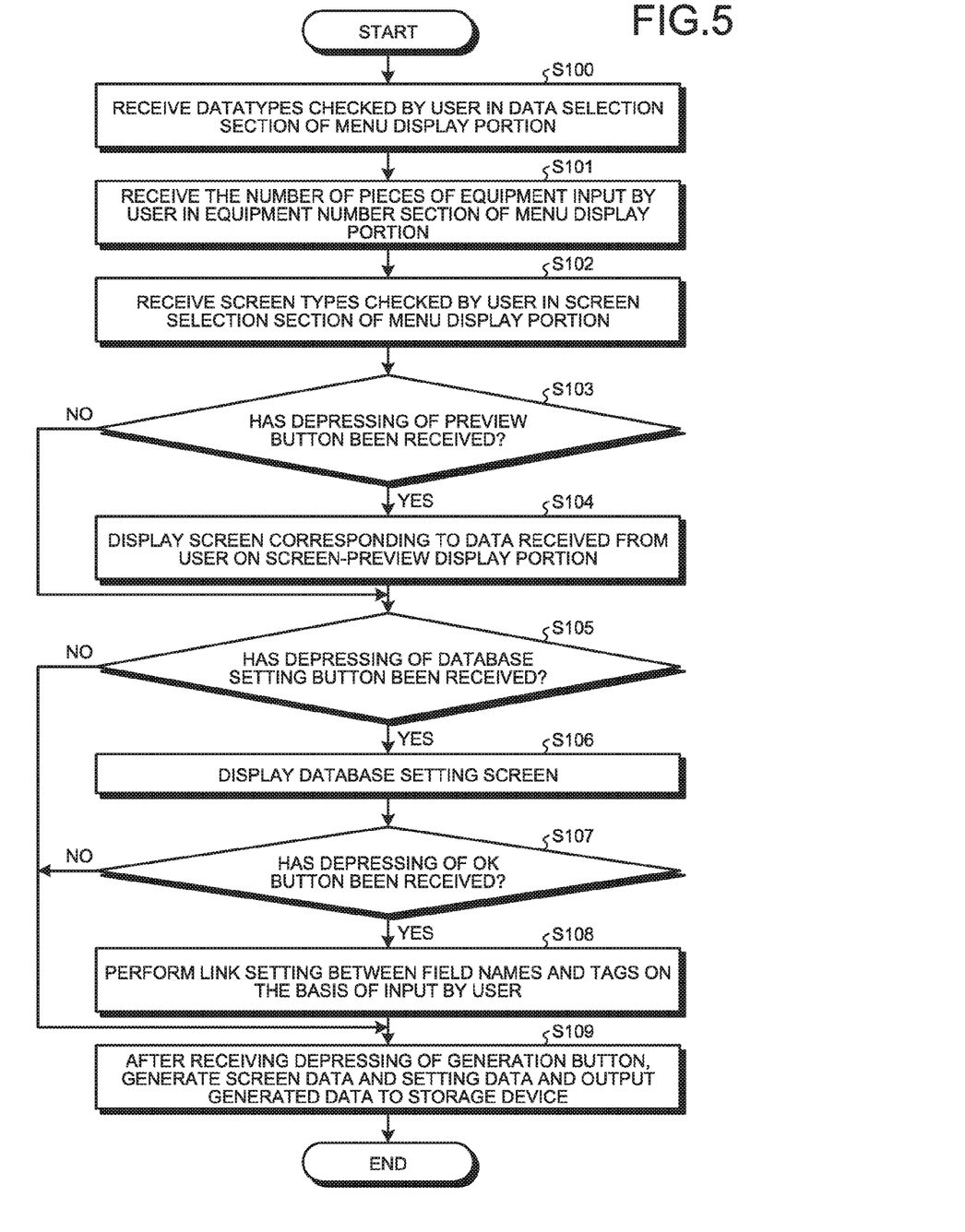
FIG. 5 is a flowchart for explaining an operation of the information-system-construction support tool according to the embodiment of the present invention.

The operation of the information-system-construction support tool 100 is described below with reference to a flowchart of FIG. 5. A sequence of steps in the flowchart of FIG. 5 is described by an information-system-construction support program stored in the storage device 14. First, among the checkboxes 411 to 413 of the data selection section 410 of the menu display portion 41, the datatypes of the checkboxes which a user has checked through the input device 11 are received by the setting input unit 22 (Step S100). FIG. 4 illustrates an example in which the check-box 411 for the "basic unit" and the checkbox 413 for the "production quantity" are checked. Next, the setting input unit 22 receives the number of pieces of equipment (Step S101) input by the user into the equipment number section 420 of the menu display portion 41 through the input device 11 and corresponding to the number of pieces of equipment of the datatypes received by the setting input unit 22 at Step S100. FIG. 4 illustrates an example in which "1" is input for the "basic unit" checked in the data selection section 410 and "2" is input for the "production quantity" checked in the data selection section 410.

Next, among the checkboxes 431 to 433 in the screen selection section 430 of the menu display portion 41, the screen types of the checkboxes checked by the user are received by the screen-type input unit 23 (Step S102). The screen types, which are a wide variety of types of screens such as an equipment screen, a trend graph, and a search screen usable in constructing the information system. 200, are prepared in advance as a template.

Next, whether the user has depressed the preview button 43 is determined by the screen-preview display unit 24 (Step S103). That is, the screen-preview display unit 24 receives the user's operation of depressing the preview button 43. When the screen-preview display unit 24 determines that the preview button 43 has been depressed (YES at Step S103), a sample screen corresponding to the data which the setting input unit 22 and the screen-type input unit 23 have received from the user is displayed on the screen-preview display portion 42 of the display device 12 (Step S104).

Figure 6:
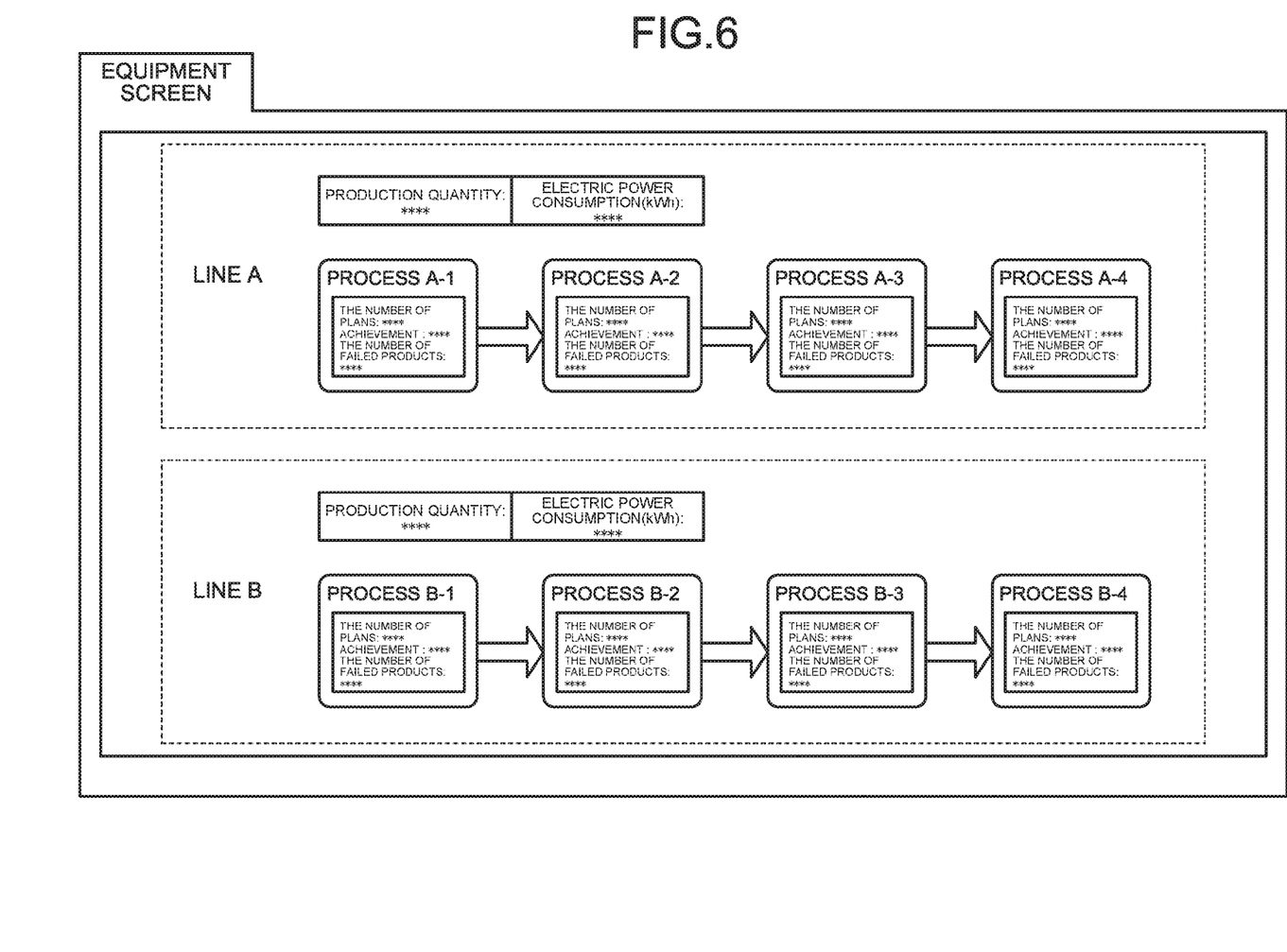
FIG. 6 is a diagram illustrating a sample screen of an equipment screen according to the embodiment of the present invention.
Figure 7:
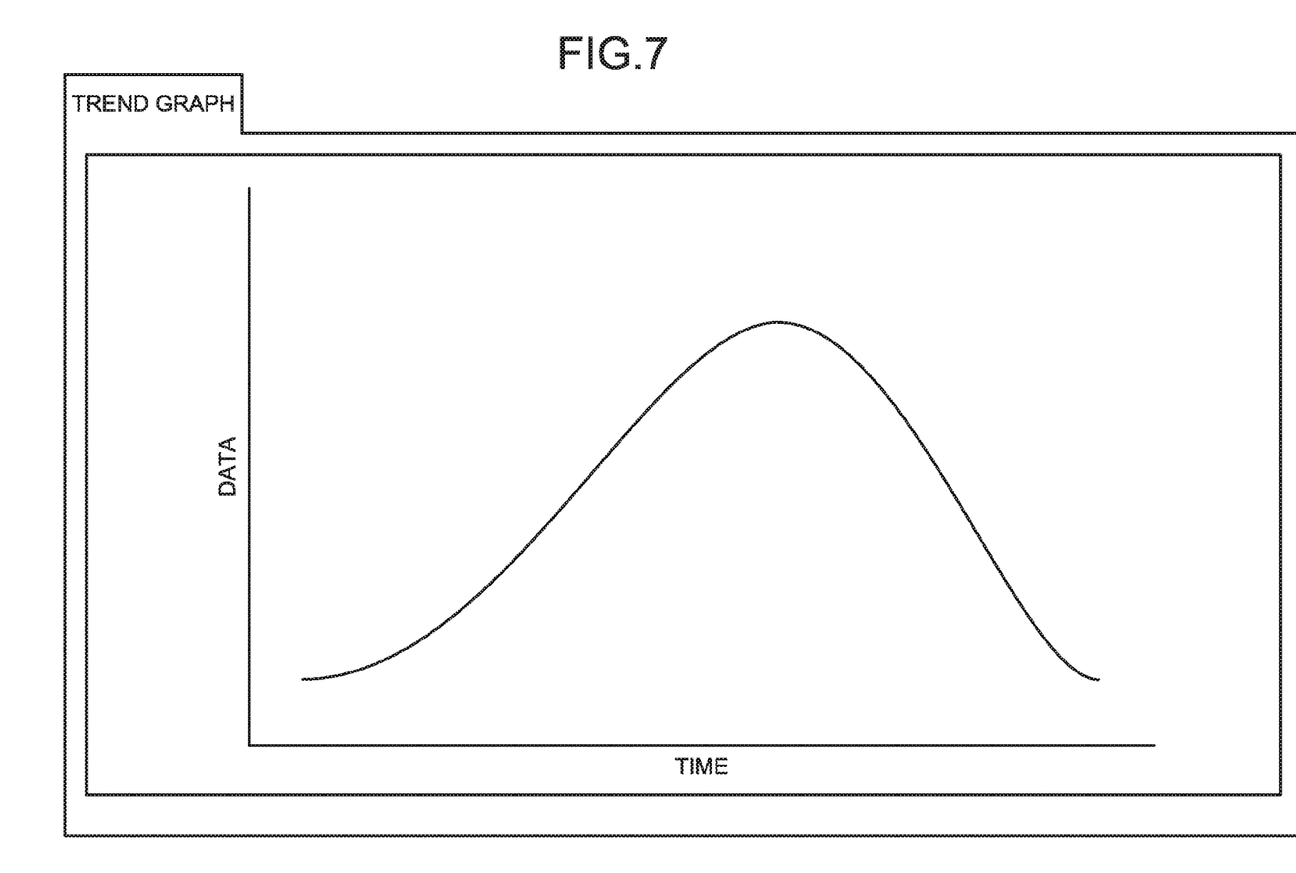
FIG. 7 is a diagram illustrating a sample screen of a trend graph according to the embodiment of the present invention.
Figure 8:
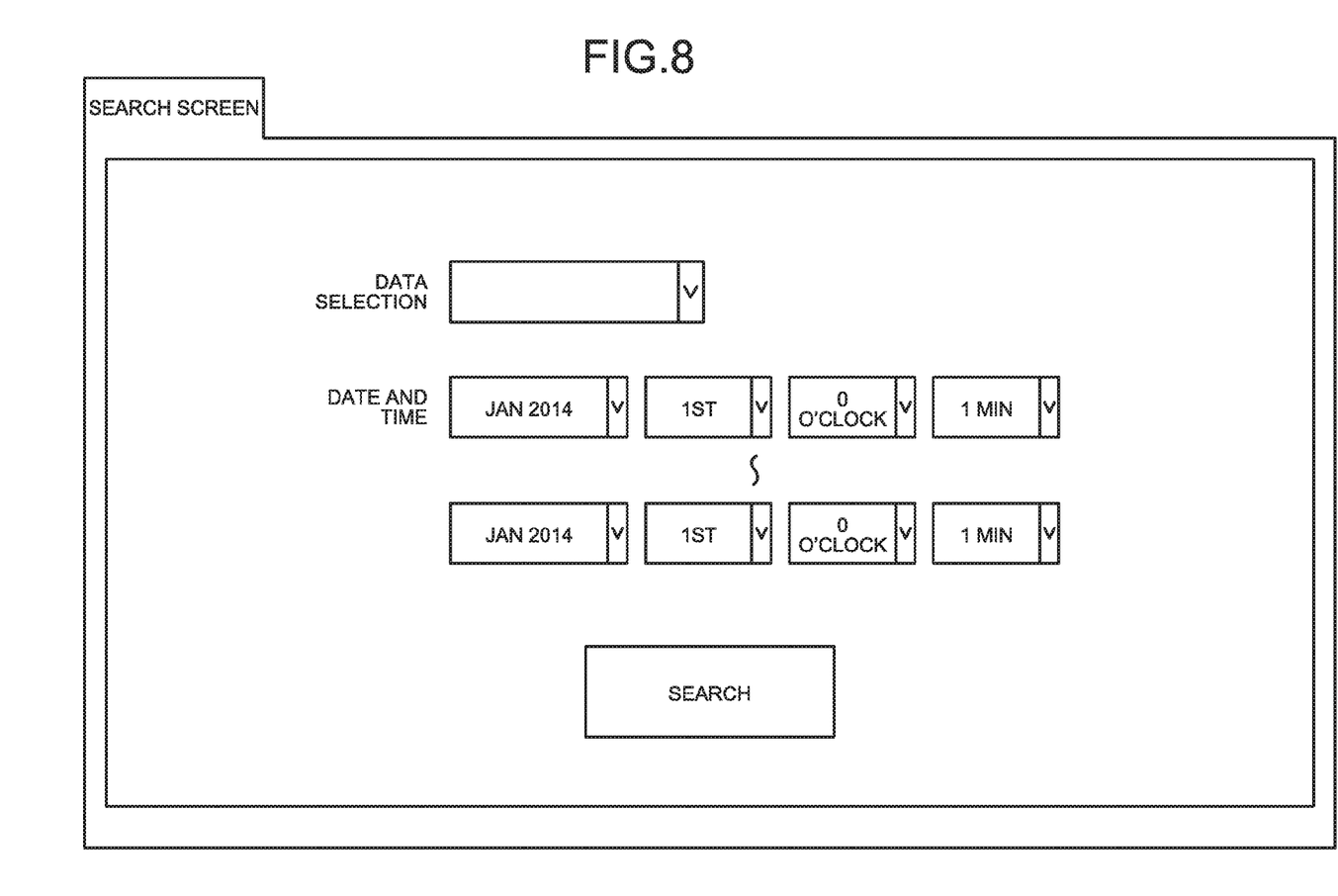
FIG. 8 is a diagram illustrating a sample screen of a search screen according to the embodiment of the present invention.

A description is made below as to a specific example of an actual operation performed from the determination of the screen-preview display unit 24 that the preview button 43 has been depressed (YES at Step S103) until the display of the sample screen on the screen-preview display portion 42 (Step S104). The data which the setting input unit 22 and the screen-type input unit 23 have received from the user at Steps S100 to S102 is saved in the storage device 14. When determining that the preview button 43 has been depressed, the screen-preview display unit 24 creates sample screens such as an equipment screen, a trend graph, and a search screen and temporarily saves the created sample screens in the storage device 14. Thereafter, the screen-preview display unit 24 obtains from the storage device 14 the data such as the setting value received from the user, and, on the basis of the obtained data, displays on the screen-preview display portion 42 the sample screens temporarily saved in the storage device 14. FIG. 6 is a diagram illustrating a sample screen of an equipment screen. FIG. 7 is a diagram illustrating a sample screen of a trend graph. FIG. 8 is a diagram illustrating a sample screen of a search screen.

The screen-preview display portion 12 displays a preview of only one of the screen types selected by the user on the menu display portion 41 as illustrated in FIG. 4. When the plural screen types are selected by the user, the other screens that are not previewed are displayed in tabs 401, 402, and 403, and the preview display can be switched by the user selecting one of the tabs 401, 402, and 403. When the number of pieces of equipment is plural, the equipment screen is the single screen displaying the arranged components corresponding to the set number of pieces of equipment, such as a line A and a line B, as illustrated in FIG. 6. For the trend graph and the search screen, the screens whose number corresponds to the number of pieces of equipment input at Step S101 for each data are generated and displayed by the datatype selected at Step S100. A plurality of screens corresponding to plural types of screens and the plural pieces of equipment can be displayed simultaneously, for example, by dividing the screen on the preview display.

Figure 9:
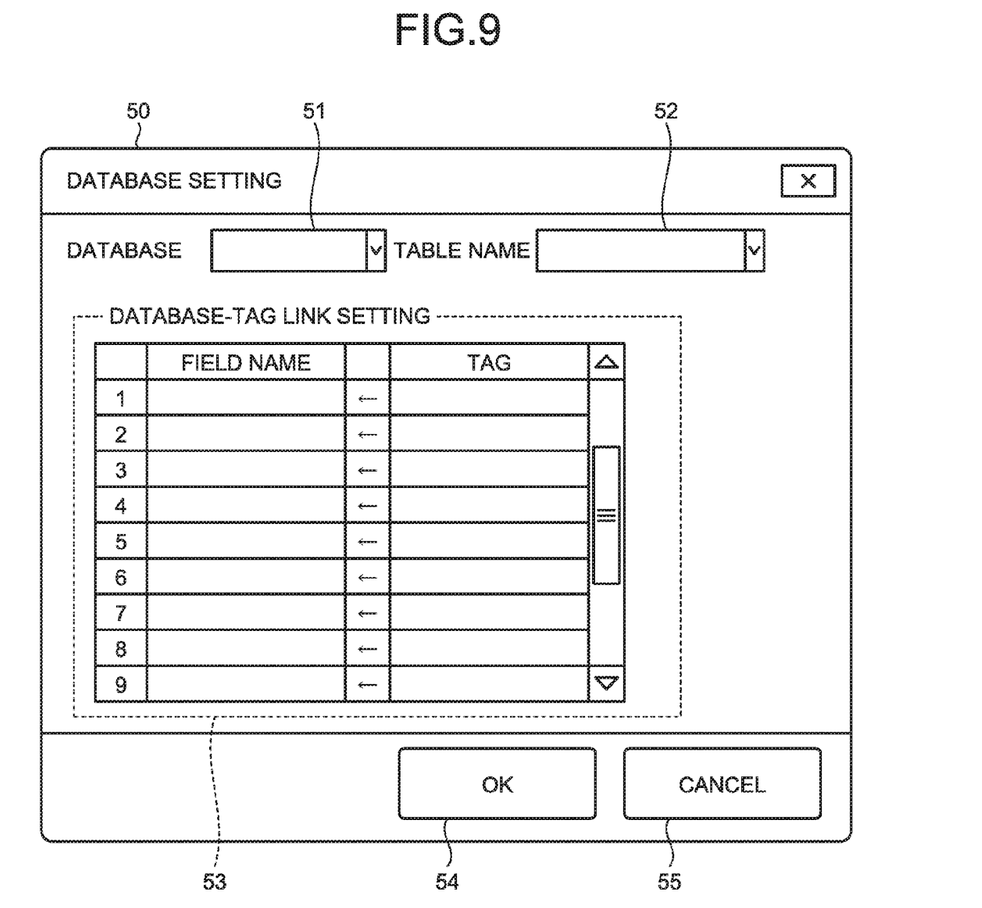
FIG. 9 is a diagram illustrating a database setting screen displayed on the display device according to the embodiment of the present invention.

When the operation of depressing the preview button 43 has not been received (NO at Step S103) or after Step S104, the operation proceeds to Step S105 at which the database setting unit 25 determines whether the user's operation of depressing the database setting button 44 has been received (Step S105) when the database setting unit 25 determines that the user has depressed the database setting button 44 (YES at Step S105), the database setting screen 50 illustrated in FIG. 9 is displayed by the database setting unit 25 on the display device 12 (Step S106).

As illustrated in FIG. 9, the database setting screen 50 includes a database-name designation box 51 for designating a database name, a table-name designation box 52 for designating a table of the database 31 designated in the database-name designation box 51, and a link setting section 53. The link setting section 53 is illustrated in FIG. 9 as a section reading "database-tag link setting". The database setting screen 50 also includes an OK button 54 for causing the database setting unit 25 to perform the setting input by the user, and a cancel button 55 for canceling the setting input by the user.

When receiving the operation of depressing the database setting button 44, the database setting unit 25 designates the database name in an SQL (Structured Query Language) statement and issues the database name to the database setting tool 102 to thereby obtain a table name of the database having the designated database name. This enables the table name corresponding to the database name input to the database-name designation box 51 to be displayed in a pull-down menu in the table-name designation box 52 in FIG. 9 for user's selection.

The user inputs, into the database-name designation box 51, a database name to be designated, and inputs a table name of the relevant database in the table-name designation box 52. The user further inputs, into the link setting section 53, field names in the table designated in the table-name designation box 52 and tags that set device values of PLCs. Under the column of the field name, the user inputs datatypes selectable on the menu display portion 41, or datatypes that are not selectable on the menu display portion 41 but are desired by the user to be stored in the database 31. Thereafter, whether the database setting unit 25 has received the operation of depressing the OK button 54 is determined at Step S107.

When it is determined that the database setting unit 25 has received the operation of depressing the OK button 54 (YES at Step S107), the database setting unit 25 can create the setting data, i.e., the unit 25 can create the database name, the table name, the field names, and the link setting between the field names and the tags on the basis of the user's input described above, and temporarily save the created setting data in the storage device 14 (Step S108). When the link setting between the field names and the tags is not input, the database name, the table name, and the field names, which are the setting data for the database 31, are created as temporary data and are saved in the storage device 14. When the cancel button 55 is depressed and it is not determined that the database setting unit 25 has received the operation of depressing the OK button 54 (NO at Step S107), the operation proceeds to Step S109.

After Step S108 or when the user's operation of depressing of the database setting button 44 has not been received (NO at Step S105), the data generation unit 26 becomes a state in which the data generation unit 26 waits for reception of the user's operation of depressing the generation button 45. When receiving the user's operation of depressing the generation button 45, the data generation unit 26 collectively generate screen data and setting data (Step S109) on the basis of the setting values which the setting input unit 22 has received from the user, the sample screens which the screen-preview display unit 24 has temporarily saved in the storage device 14, and the data created by the database setting unit 25. The screen data and the setting data generated by the data generation unit 26 are output as a file to, for example, the non-volatile storage device of the storage device 14 such as a HDD (Hard Disk Drive) (Step S109). When the information-system-construction support tool 100 ends without the generation button 45 being depressed, the setting data and the sample screens temporarily saved in the storage device 14 are deleted.

Figure 10:
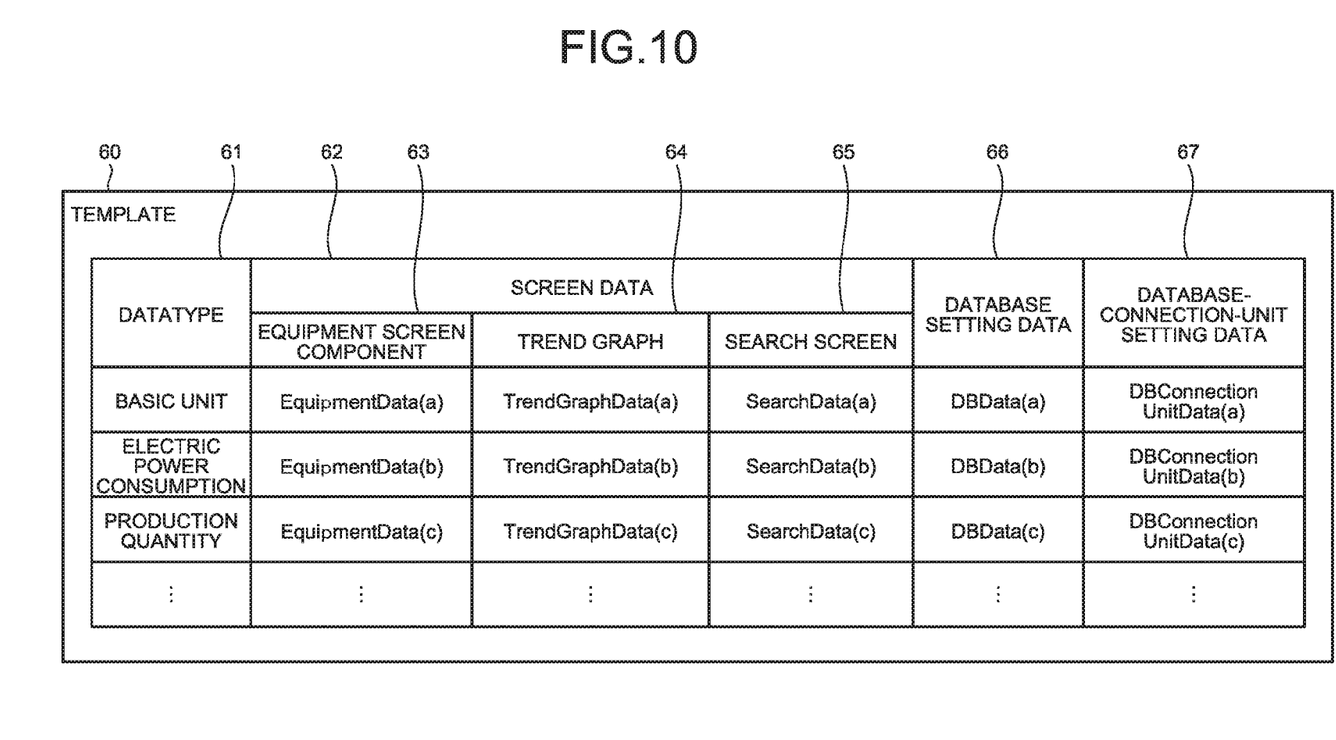
FIG. 10 is a configuration diagram of a template of screen data and setting data according to the embodiment of the present invention.

FIG. 10 is a configuration diagram illustrating a state in which the screen data and the setting data generated at Step S109 on the basis of the setting values which the setting input unit 22 has received from the user, the screen types which the screen-type input unit 23 has received from the user, and the link setting performed by the database setting unit 25 are collectively held as a template 60. The template 60 is configured by screen data 62, database setting data 66, and database-connection-unit setting data 67 for each of datatypes 61 being the datatypes selected by the user. The information-system-construction support tool 100 prepares in advance the template 60 configured to allow the respective data by each datatype 61 to be treated in association with each other. When the screen data and the setting data are generated at Step S109, the data generation unit 26 causes the storage device 14 to save a data file having the screen data and the setting data set in the template 60.

The screen data 62 is defined by an equipment screen component 63, a trend graph 64, and a search screen 65. The equipment screen component 63 is component data that constitutes the equipment screen, and the equipment screen as illustrated in FIG. 6 is created by arranging the component data on the equipment screen. The component data corresponds to one piece of equipment and, when there are plural pieces of equipment, plural pieces of data corresponding to the respective pieces of equipment are input in one row. FIG. 10 illustrates an example in which the number of pieces of equipment is one. The trend graph 64 is trend graph data for the screen-display edit tool 101. The search screen 65 is search screen data for the screen-display edit tool 101. The trend graph and the search screen are collectively displayed regardless of the number of pieces of equipment and, thus, one data is input in one row in each of the trend graph 64 and the search screen 65.

The database setting data 66 is setting data used by the database setting tool 102 that performs setting of the database 31, and includes the database name, the table name, and the field names. The database-connection-unit setting data 67 is setting data used by the database-connection-unit setting tool 103 that performs setting of the database connection unit 32, and includes link setting between the field names and the tags, the tags being the device values of the PLCs. While the database setting data 66 and the database-connection-unit setting data 67 are the setting data, the database-connection-unit setting data 67 out of the setting data is blank when the link setting between the field names and the tags is not input by the user on the screen illustrated in FIG. 9 as described above.

That is, the information which the user has set on the information-system-construction support tool screen 40 and the information which the user has set on the database setting screen 50 are the values input to the template 60 to generate the screen data and setting data. As a result, the various data in the template 60, i.e., the equipment screen component 63, the trend graph 64, the search screen 65, the database setting data 66, and the database-connection-unit setting data 67 are set in association with each other on a datatype 61 basis. Specifically, for example, "EquipmentData(a)", "TrendGraphData(a)", "SearchData(a)", "DBData(a)", and "DBConnectionUnitData(a)", which are the data regarding the "basic unit", are arranged in a row of the "basic unit" among the datatypes 61 in FIG. 10 and associated with each other by the same identifier "(a)" assigned thereto. Similarly, the equipment screen component 63, the trend graph 64, the search screen 65, the database setting data 66, and the database-connection-unit setting data 67 in the row under the "basic unit", which are the data regarding the "electric power consumption" or the "production quantity", are associated with each other by an identifier "(b)" or "(c)". The data generation unit 26 generates the screen data and the setting data that are the equipment screen component 63, the trend graph 64, the search screen 65, the database setting data 66, and the database-connection-unit setting data 67 having their identifiers for association with the same datatype.

As illustrated in FIG. 3, the screen data output by the data generation unit 26 to the storage device 14 can be used by the screen-display edit tool 101, and the setting data output by the data generation unit 26 to the storage device 14 can be used by the database setting tool 102 and the database-connection-unit setting tool 103.

Thus, the screen-display edit tool 101 can display a screen on the display device 12 on the basis of the screen data 62 output at Step S109. Thereafter, the user can edit the screen via the screen-display edit tool 101 by, for example, changing the layout of the equipment screen or displaying additional user-created data on the screen.

Furthermore, the database setting tool 102 can perform setting of the field names, the table name, and the database name of the database 31 on the basis of the database setting data 66 output at Step S109.

The database-connection-unit setting tool 103 can perform link setting between the tags being the device values of the PLCs and the field names in the database connection unit 32 on the basis of the database-connection-unit setting data 67 output at Step S109.

To construct the information system, a user has been hitherto needed to use the screen-display edit tool 101, the database setting tool 102, and the database-connection-unit setting tool 103, individually, to separately set the types of screens to be displayed by the screen-display edit tool 101 and various data for the database 31 and the database connection unit 32.

In contrast, the information-system-construction support tool 100 according to the present embodiment enables the setting data and screen data corresponding to the information system 200 to be generated through the simple user's input-and selection-operations on the information-system-construction support tool screen 40 in FIG. 4 and the database setting screen 50 in FIG. 9, and provided to the screen-display edit tool 101, the database setting tool 102, and the database-connection-unit setting tool 103. This can reduce the burden on the user. Furthermore, because the screen data and the various setting data are provided in a set, a failure due to mismatch between various setting data can be prevented.

The configurations described in the above embodiment are only an example of the contents of the present invention. The configurations can be combined with other well-known techniques, and a part the configuration can be omitted or modified without departing from the scope of the present invention.

REFERENCE SIGNS LIST 10 personal computer, 11 input device, 12 display device, 13 central processing device, 14 storage device, 21 menu-screen display unit, 22 setting input unit, 23 screen-type input unit, 24 screen-preview display unit, 25 database setting unit, 26 data generation unit, 31 database, 32 database connection unit, 40 information-system-construction support tool screen, 41 menu display portion, 42 screen-preview display portion, preview button, 44 database setting button, 45 generation button, 50 database setting screen, 51 database-name designation box, 52 table-name designation box, 53 link setting section, 54 OK button, 55 cancel button, 60 template, 61 data type, 62 screen data, 63 equipment screen component, 64 trend graph, 65 search screen, 66 database setting data, 67 database-connection-unit setting data, 71, 72, . . . , 7n PLC, 100 information-system-construction support tool, 101 screen-display edit tool, 102 database setting tool, 103 database-connection-unit setting tool, 200 information system, 401, 402, 403 tab, 410 data selection section, 411 to 413, 41 to 433 check box, 420 equipment number section, 421 to 423 the number of pieces of equipment, 430 screen selection section.

The invention claimed is:
1. An information-system-construction support apparatus comprising:
 a memory which stores executable instructions; and
 a processor which executes the stored executable instructions, which when executed by the processor, cause the processor to perform the following operations:

receiving a first selection of a datatype from among a plurality of datatypes comprising a basic unit datatype, an electric power consumption datatype, and a product quantity datatype, wherein each of the plurality of datatypes represents data collected by a plurality of programmable logic controllers (PLCs);

receiving a second selection of a screen type from among a plurality of screen types comprising an equipment screen type, a search screen type, and a trend graph type, wherein each of the plurality of screen types represents format for display data of the data collected by the plurality of PLCs;

retrieving a third selection of a setting data set from among a plurality of setting data, based on the first selection of the datatype and the second selection of the screen type, wherein the plurality of setting data comprises connection information which links each of the plurality of PLCs with a respective database from among a plurality of databases which store the data collected by the plurality of PLCs, the setting data is generated based on a database tag link setting in which field names of the display data are connected with tags that set device values of the plurality of PLCs on a type by type basis;

generating a template populated based on the first selection of the datatype, the second selection of the screen type, and the third selection of the setting data set and in which the setting data set is associated with the screen type and the datatype;

generating a preview screen based on the generated template; and displaying the generated preview screen, wherein the memory stores the generated template which is read by a screen-display edit tool that displays and edits the generated preview screen using the display data, a setting tool for the plurality of databases storing said data collected by the plurality of PLCs, and a setting tool for a database connection device thereby improving monitoring productivity and equipment utilization on a production site.

2. The information-system-construction support apparatus according to claim 1, wherein the generated preview screen is displayed on a display and comprises a plurality of preview screens generated based on the datatype and the screen type.

3. A non-transitory computer readable medium storing an information-system-construction support program which when executed by a computer, causes the computer to perform the following operations:

receiving a first selection of a datatype from among a plurality of datatypes comprising a basic unit datatype, an electric power consumption datatype, and a product quantity datatype, wherein each of the plurality of datatypes represents data collected by a plurality of programmable logic controllers (PLCs);

receiving a second selection of a screen type from among a plurality of screen types comprising an equipment screen type, a search screen type, and a trend graph type, wherein each of the plurality of screen types represents format for display data of the data collected by the plurality of PLCs;

retrieving a third selection of a setting data set from among a plurality of setting data, based on the first selection of the datatype and the second selection of the screen type, wherein the plurality of setting data comprises connection information which links each of the plurality of PLCs with a respective database from among a plurality of databases which store the data collected by the plurality of PLCs, the setting data is generated based on a database tag link setting in which field names of the display data are connected with tags that set device values of the plurality of PLCs on a type by type basis;

generating a template populated based on the first selection of the datatype, the second selection of the screen type, and the third selection of the setting data set and in which the setting data set is associated with the screen type and the datatype;

generating a preview screen based on the generated template; and displaying the generated preview screen, wherein the generated template is stored in a memory and read by a screen-display edit tool that displays and edits the generated preview screen using the display data, a setting tool for the databases storing said data collected by the plurality of PLCs, and a setting tool for a database connection device thereby improving monitoring productivity and equipment utilization on a production site.

4. The non-transitory computer readable medium storing the information-system-construction support program according to claim 3, wherein the program, which when executed by the computer, further causes the computer to perform displaying a plurality of preview screens on the display based on the datatype and the screen type.

5. The non-transitory computer readable medium storing the information-system-construction support program according to claim 3, wherein the generating of the setting data set comprises:

displaying a database setting screen in which the setting tool receives a database name designation from among a plurality of database name designations for the plurality of databases storing said data collected by the plurality of PLCs and in which the setting tool receives a table name from among a plurality of table names based on the database name designation; and generating a database tag link setting screen in which the field names of the display data are obtained from the received table name and each of the field names receives a respective tag from among the tags that set the device values of the PLCs.

6. The non-transitory computer readable medium storing the information-system-construction support program according to claim 5, wherein the field names comprises a first datatype from among the plurality of datatypes, which are selectable in the first selection of the datatype and a second datatype from among the plurality of datatypes which are not selectable in the first selection and is at least a portion of said data collected by the plurality of PLCs and stored in at least one of the plurality of databases.

7. The non-transitory computer readable medium storing the information-system-construction support program according to claim 3, wherein the generated template comprises the display data of the screen type in the second selection of the screen type being link with a designation of the respective database and tags of the data type in the first selection of the datatype.

8. The non-transitory computer readable medium storing the information-system-construction support program according to claim 3, which, when executed by the computer, further performs:

receiving a fourth selection comprising a number of manufacturing lines to be displayed in the generated preview screen, wherein each of the manufacturing lines comprise processes executed by a plurality of pieces of an equipment, wherein the generated preview screen further comprises sum of production quantities of the plurality of pieces of the equipment for each of the manufacturing lines displayed in the screen type selected in the second selection.

9. The non-transitory computer readable medium storing the information-system-construction support program according to claim 3, wherein the setting data is generated before the receiving of the first selection of the datatype and the second selection of the screen type.

10. The non-transitory computer readable medium storing the information-system-construction support program according to claim 3, which, when executed by the computer, further performs: receiving a fourth selection comprising database setting in which the setting data is generated on the type by type basis, based on user input and data from the plurality of databases.

* * * * *